March 9, 1971 M. GROSSE 3,568,345
DISPLAY DEVICES

Filed July 24, 1968 3 Sheets-Sheet 2

March 9, 1971 M. GROSSE 3,568,345
DISPLAY DEVICES
Filed July 24, 1968 3 Sheets-Sheet 3

United States Patent Office 3,568,345
Patented Mar. 9, 1971

3,568,345
DISPLAY DEVICES
Maurice Grosse, London N. 10, England
Filed July 24, 1968, Ser. No. 747,205
Claims priority, application Great Britain, Aug. 2, 1967,
35,588/67
Int. Cl. G09f 11/32
U.S. Cl. 40—36          9 Claims

ABSTRACT OF THE DISCLOSURE

A device for displaying both sides of a series of poster-like sheets in a continuously repeated manner, the sheets being positively engaged and transferred, one at a time, around a roller from a viewing position to the rear of a stack of the sheets and the device including electrically-operated delay mechanism to govern the length of viewing time for each side of each sheet.

---

Figure 1:
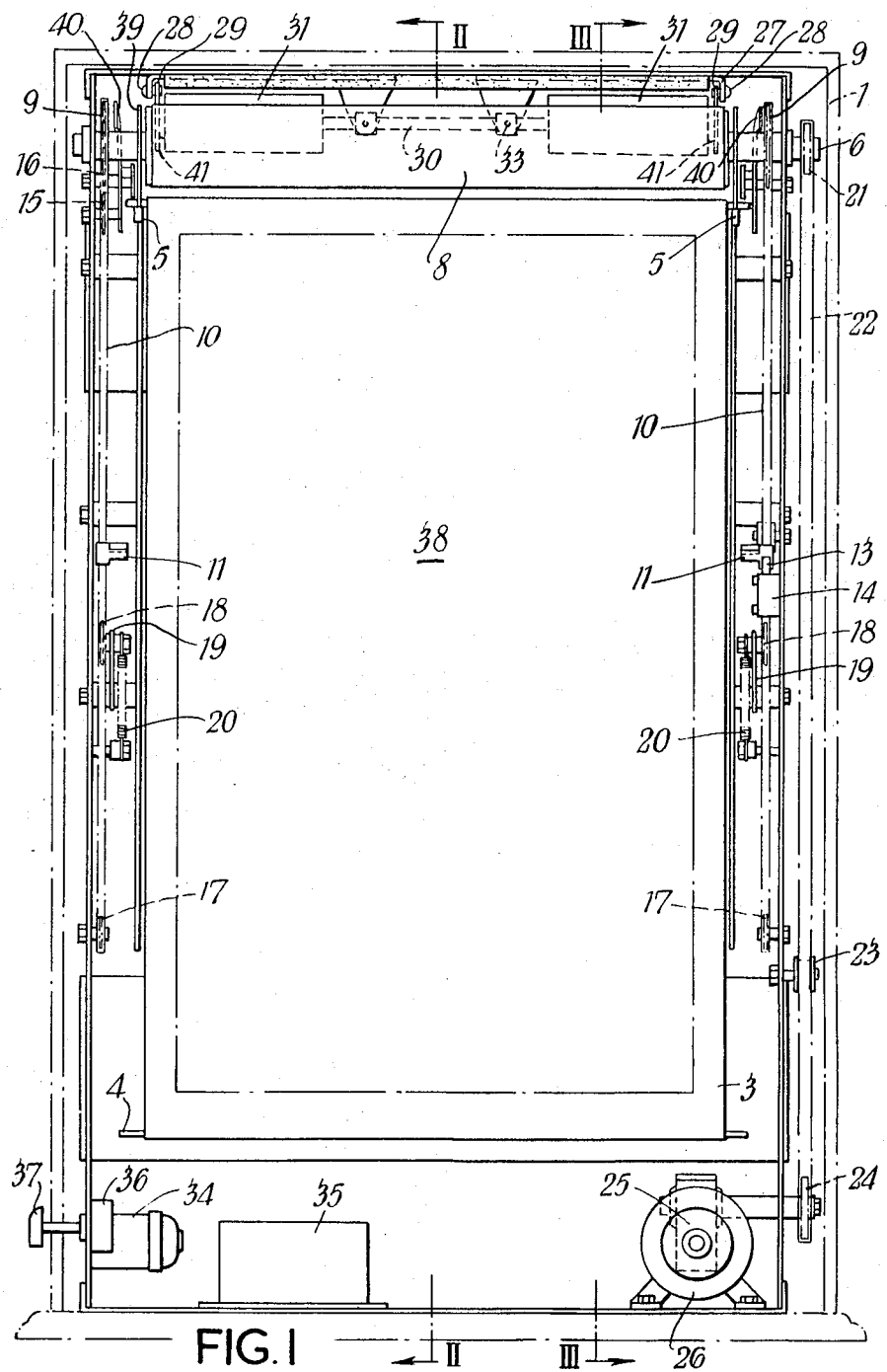

This invention relates to display devices.

Many different forms of display device are known for exhibiting a series of pictures, notices, advertisements or the like one after the other in an automatic manner with continuous repetition of the series. However, such devices are not widely used for the purposes for which they are most suitable owing to the fact that the majority of them are large in dimensions relative to the size of pictures or the like which they can actually display. This renders them somewhat uneconomic in use where space can apparently be employed more profitably, such as, purely for example, in supermarkets and shop windows.

Attempts have been made to solve the problems discussed above by employing devices in which flexible sheets are arranged in a substantially horizontal stack with one side of a front end sheet of the stack visible to a viewer, the sheets being moved upwardly, one at a time, to follow a curved path around a frictional roller and be replaced in the stack at the opposite and rear end thereof. Both sides of each sheet are provided with pictures or other indicia and the two pictures or the like on the opposite side of each sheet are relatively inverted to take account of the reversal of the sheet (as regards its upper and lower edges) which occurs during the movement around the roller, this movement also automatically reversing the sheet as regards the side thereof which will be visible to a viewer when that sheet next becomes the foremost end sheet of the stack.

Although the construction which has just been described is successful to a large extent in overcoming the previously mentioned disadvantageous overall size to displayed picture size ratio of such devices, it has serious disadvantages of its own that have prevented its commercial use to any appreciable extent. The most important of these disadvantages is the fact that apart, possibly, from the initial drive to its moving parts, the known device is wholly mechanical in function so that the delay mechanism which must necessarily be included to make the various pictures or other indicia visible to viewers for an appreciable length of time is complicated, unreliable and is capable of little, if any, adjustment as regards the viewing period for each picture, advertisement or other indicia. Secondly, the purely frictional movement around the roller is unreliable in action so that the known device is quite incapable of being left to repeat a series of pictures, notices, advertisements or other indicia many thousands of times without attention. Trouble-free operation of this kind is clearly essential if such a device is to be used commercially to any appreciable extent.

It is an object of the invention to provide a display device that is basically similar to the known device discussed above but which overcomes, or at least considerably reduces, the disadvantages of that device.

According to the invention, there is provided a display device adapted to display a number of pictures, notices, advertisements or other indicia one after the other, the device comprising a plurality of flexible sheets both sides of each of which can carry one of said pictures, notices, advertisements or other indicia and each sheet being provided with suspension means at or near its uppermost and lowermost (when vertically disposed) edges, the device also comprising a holder adapted to receive said sheets in a stack with one side of an end sheet of the stack visible to a viewer of the device, electrically-driven means for positively engaging successive end ones of the stack of sheets and transporting them around a roller to the opposite end of the stack, and electrically-operated delay mechanism to govern the length of time during which each sheet occupies the position in which one side thereof is visible to a viewer of the device.

Figure 2:
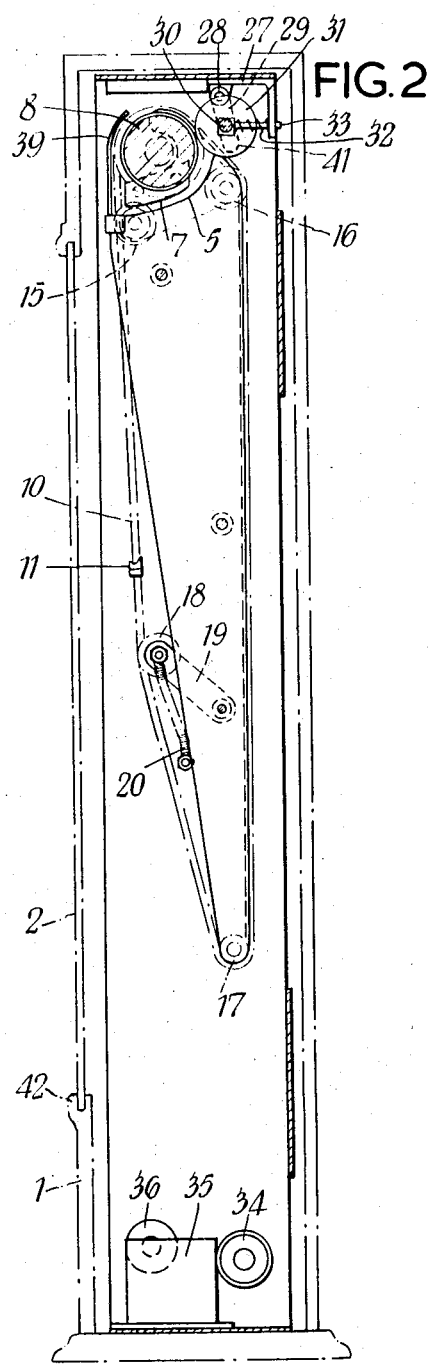
Figure 3:
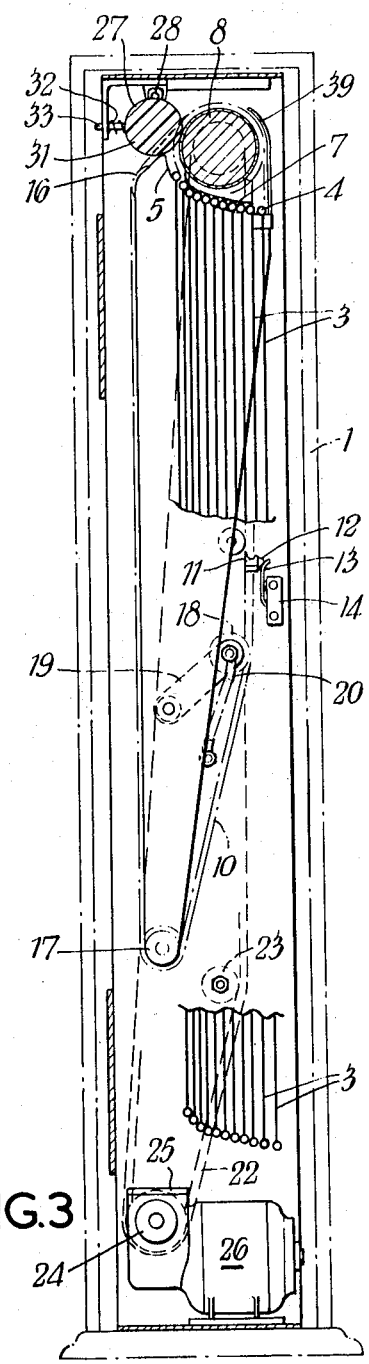
Figure 4:
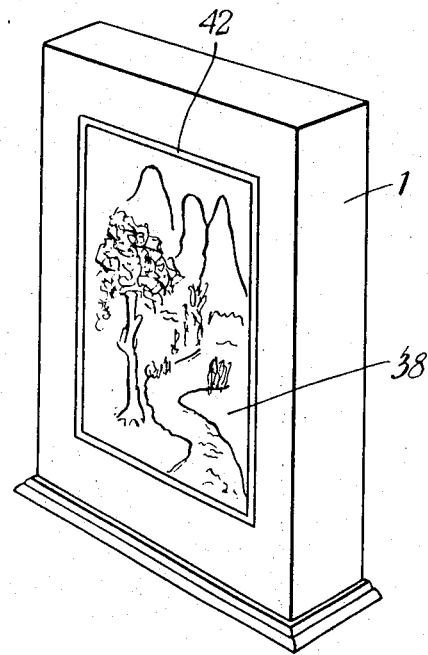
Figure 5:
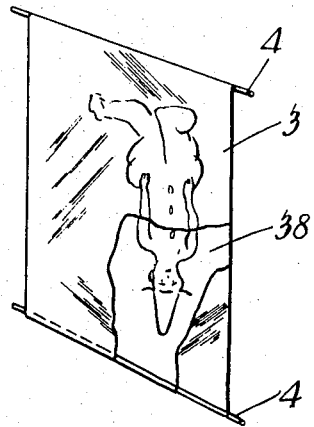

For a better understanding of the invention, and to show how the same may be carried into effect, reference will now be made, by way of example, to the accompanying drawings, in which:

FIG. 1 is a front elevation of a device in accordance with the invention with an enclosing cabinet in which the device is located being shown only in broken lines, FIG. 2 is a section taken on the line II—II of FIG. 1, FIG. 3 is a section taken on the line III—III of FIG. 1, FIG. 4 is a perspective view of the device and its cabinet to a reduced scale, and FIG. 5 is a partially broken away perspective view of one embodiment of a flexible sheet forming part of the device to the same scale as FIG. 4.

Referring to the drawings, the display device has a casing or cabinet 1 the front side of which (i.e. the side which is intended to face viewers of the device) is formed with a rectangular window 42 that is preferably, but not essentially, covered by a sheet of glass or other transparent material 2 (FIG. 2). The cabinet 1 contains a plurality of flexible sheets 3 that, in the example illustrated in FIG. 5, are, of double formation, there being two layers of a flexible transparent material, such as cellulose acetate, between which two pictures, notices, advertisements or other indicia 38 can be removably arranged in back-to-back relationship so that one of the pictures or the like 38 is visible at one side of the double sheet whilst the other picture or the like 38 is visible at the opposite side thereof. The pictures or the like are arranged in the double sheet 3 in such a way that, when that sheet is vertically disposed, the pictures or the like 38 on opposite sides thereof are relatively inverted. It is not essential that the sheets 3 should be "double" sheets of the kind just described and it is possible to make them from any material that has good flexibility but is substantially non-elastic, is capable of carrying indicia 38 on both its sides in a temporary or permanent manner and has a good resistance to tearing even after having been flexed a very large number of times. A simple "single" sheet of this kind may be made from a material such as opaque lacquered linen. In an alternative, and preferred, construction of the sheets 3 that is not illustrated, a single flexible centre piece is provided with flexible posters or the like on its opposite sides by releasably attaching the posters to the centre sheet with double-sided adhesive tape or the like that is readily available commercially. This tape is employed at the uppermost and lowermost edges of the centre piece and posters.

The uppermost and lowermost edges of each rectangular sheet 3 are provided with suspension means in the form of substantially rigid metal or synthetic plastics rods 4 of small cross-sectional diameter (i.e. of the order of about ⅛" or 3 mm.). Each rod 4 has a length in excess of that of the edge of the sheet 3 to which it is attached and is arranged to project a distance of about 1" (2.5 cm.) beyond each end of said edge. The projecting end portions of the rod 4 may, if required, be provided with sound- and shock-absorbing buffer rings (not shown) formed from rubber of a synthetic plastics material. It is emphasized that the dimensions which have just been mentioned relate to the example under consideration and that both larger and smaller dimensions can be used in other devices in accordance with the invention.

The sheets 3, of which there may, purely for example, be up to twenty, are carried by a holder located internally of the casing or cabinet 1 and taking the form of two downwardly and forwardly inclined ramps 5 that are located at opposite lateral sides of the casing or cabinet and upon which the projecting end portions of the upper (at any given time) suspension rods 4 rest. The ramps 5 may be formed from smooth metal, polytetrafluoroethylene or some other synthetic plastics material. The sheets 3 are all substantially vertically disposed when suspended from the holder and are stacked one behind the other with the front end sheet 3 of the substantially horizontally extending stack having one of its sides visible to viewers through the aforementioned rectangular window 42 which can be seen best in FIG. 4 of the drawings. It has been found that the disposition of the ramps 5 is important in ensuring that the upper rods 4 do not become entangled with one another or come into overlapping relationship. Said ramps 5 are so arranged that the uppermost rods of the sheets 3 tend to slide downwardly therealong towards the front side of the device in which the rectangular window 42 is formed and it will be seen from FIGS. 2 and 3 of the drawings that said ramps 5 have lower generally rectilinear portions which merge progressively into upper curved portions in such a way that tangents to said curved portions are inclined at progressively increasing angles to the horizontal as the distance from the lowermost end of the corresponding ramp 5 increases. The ramps 5 may, in some devices in accordance with the invention be mounted so that their inclination to the horizontal is adjustable. The optimum angle will depend upon the number of sheets 3 in use at any time and is inversely proportional to the number of sheets (i.e. a larger number of sheets 3 requires a smaller inclination to the horizontal and vice versa). It has been found that, with fixed ramps 5, the device operates at optimum efficiency when the lower more or less rectilinear portions of the ramps are inclined to the horizontal at angles of approximately 12°. Profiled members 7 located immediately above the ramps 5 have their lowermost edges in such positions that they cooperate with said ramps 5 in forming narrow slideways of dimensions such that the rods 4 are prevented from becoming tangled with one another. In order to keep the noise of operation to a minimum, rubber or other resilient blocks (not shown) may be fixed to the sides of the ramps 5 at the upper ends thereof in such a way that, when the ends of a rod 4 of one of the sheets 3 drop onto the ramps, they hit the sound-reducing blocks rather than the more rigid metal or other material of the ramps 5 themselves.

The device which is being described by way of example is provided with means to display the pictures, notices, advertisements or other indicia one after the other in a continuously repeated manner. Immediately above the closely adjacent upper edges of the suspended sheets 3, a rotatable shaft 6 carries a roller 8 which may be formed from rubber, polyurethane foam or the like. The shaft 6 carries, at locations spaced short distances from opposite ends of the roller 8, two sprocket wheels 9 around which pass corresponding endless transmission chains 10, these chains preferably, but not essentially, being formed from a synthetic plastics material such as nylon to keep the noise produced by the mechanism to a minimum and also to reduce the need for lubrication and other maintenance of the chains to a minimum. A toothed belt may be used in place of each chain 10 (and a plain or toothed belt in place of the chain 22 which will be mentioned later) and it is to be understood that the term "chain" is to be interpreted as including a plain or toothed belt throughout this specification Similarly, the term "sprocket wheel" is to be interpreted as including "toothed or plain pulley" as appropriate.

The two chains 10 are of the same length and each one has rigidly secured to it, at the same point therealong, a cradle 11 shaped, as will hereinafter be apparent, to make positive transporting engagement with the opposite ends of successive ones of the rods 4. One of the two cradles 11 incorporates a finger 12 (FIG. 3) arranged to make engagement with the operating lever 13 of a microswitch 14 secured to the framework of the device at each time that said finger 12 passes the location at which the switch 14 is mounted. As can be seen best in FIG. 2 of the drawings and considered in the intended direction of movement of the chains 10, each chain 10 passes around a guide sprocket 15 located at the approach side to the corresponding sprocket wheel 9, a guide sprocket 16 located at the departure side of said sprocket wheel, a guide sprocket 17 located towards the foot of the device and a jockey sprocket 18. Each jockey sprocket 18 is mounted on a turntable bracket 19 under the action of a corresponding tension spring 20 which turns the bracket 19 about its pivital mounting in a direction such as to tend to maintain the corresponding chain 10 in tension at all times.

An extreme end of the shaft 6 upon which the roller 8 and sprocket wheels 9 are mounted is provided with a sprocket wheel 21 around which passes an endless transmission chain 22 that is preferably, but not essentially, formed from a similar material to the two chains 10. The chain 22 also passes around a guide sprocket 23 and a sprocket wheel 24 secured to the rotary output shaft of a speed reduction gear box 25 carried, and driven, by a fractional horsepower electric motor 26 mounted at the bottom of the framework of the device.

A bracket 27 secured to the top of the framework of the device carries aligned pivot pins 28 about which two arms 29 are turnable. The two arms 29 support a shaft 30 that extends parallel to the shaft 6 and about the axis of which two jockey rollers 31 are rotatable, each jockey roller 31 being smaller in diameter than the roller 8 and having an axial length less than half that of the roller 8. It is preferred that the bodies of the two jockey rollers 31 should be formed from a resilient material such as rubber, polyurethane foam or the like. The two jockey rollers 31 are urged into engagement with the roller 8 by helical compression springs 32 that are wound around rods 33 located between the jockey rollers 31 with one end of each of them connected to the shaft 30. The opposite end of each rod 33 is entered through a hole formed in a corresponding downwardly directed portion of the bracket 27. It will thus be evident that the springs 32 tend to maintain the rotatable jockey rollers 31 in engagement with the driven roller 8 but that said jockey rollers 31 can be moved bodily out of contact with the roller 8 by turning them about the common axis of the pivot pins 28 against the action of said springs 32, the rods 33 moving further through the holes in the downwardly directed portions of the bracket 27 under these circumstances.

The fractional horsepower electric motor 26 is a capacitor-start motor provided with a capacitor 34 that is secured to one side of the framework of the device at the foot of the latter. The device includes electrically-operated delay mechanism to govern the length of time during which each sheet 3 occupies the position in which one side thereof is visible to a viewer of the device through the window 42. In the example which is being described, this delay mechanism is afforded principally by a multivibrator timing circuit 35 which includes a self-holding relay. Said mechanism also includes a variable resistance 36 the operating shaft of which projects through an opening in the side of the cabinet 1 and is provided, at the exterior of said cabinet, with a knob 37 which may include a pointer co-operating with a scale (not shown) marked on the exterior of the cabinet 1. Since multi-vibrator timing circuits such as the circuit 35 are well known per se, the details of the circuit 35 are not shown in the drawings and the electrical conductors which interconnect the microswitch 14, the motor 26, the capacitor 34, the circuit 35 and the variable resistance 36 are not shown in the drawings for the sake of simplicity.

The basically known circuit 35 is arranged to produce electrical pulses at regular intervals whose durations are dependent upon the adjusted value of the resistance 36 and the production of a pulse by the circuit 35 is arranged to trip or close the self-holding relay and start the motor 26 running. The microswitch 14 is arranged in a branch of the circuit 35 in such a way that movement of its operating lever 13 will release the self-holding relay thus stopping the motor 26. The inertia of the various moving parts is quite sufficient to move the finger 12 past the lever 13 after the supply of electricity to the motor 26 ceases and it will be realised that the motor 26 will not commence operation again until the next pulse is produced by the circuit 35.

The device may be filled with any number of sheets 3 up to a maximum which, in the described example, is about twenty. When "double" sheets 3 of the kind which have been described with reference to FIG. 5 of the drawings are employed, two pictures, notices, advertisements or other indicia 38 are slid between the two parts of the sheet in back-to-back and relatively inverted relationship, one such inverted picture 38 being visible in FIG. 5 whilst another picture 38 can be seen the right way up in FIG. 4. It will be realised that only one picture 38 need be used but that the corresponding sheet 3 will then show one "blank" during the viewing of a complete series. The upper rods 4 of the sheets 3 are arranged on the holder ramps 5 in the manner which can be seen in the drawings and, as soon as all is ready, the electricity supply to the device is switched on. The cradles 11 move upwardly from positions a little above those illustrated in the drawings by virtue of the drive transmitted to the shaft 6 from the motor 26 and said cradles soon encounter, and positively engage, the opposite ends of the upper rod 4 of the sheet 3 one side of which is visible to a viewer through the window in the cabinet 1. The entrained sheet 3 is moved upwardly past resilient guide rods 39 and around the roller 8 which is rotating at the same speed as the sprocket wheels 9 and which is of the same effective diameter as those sprocket wheels. Lateral guides 40 are also provided to prevent accidental sideways displacement of the engaged rod 4 of one of the sheets 3, that is to say, displacement in a direction substantially parallel to the longitudinal axis of the engaged rod 4. It will be seen from the drawings that the cradles 11 are shaped in such a way that the rod 4 which is engaged thereby cannot be displaced from said cradles in a direction towards the centres of the paths of travel of said cradles and it will be remembered that the chains 10 are maintained at an appreciable degree of tension by the springs 20. Accordingly, as the more or less rigid edge of the sheet 3 along which the engaged rod 4 extends meets the jockey rollers 31, said edge moves those rollers away from the roller 8 against the action of the springs 32 to allow the edge to continue past the upper ends of the ramps 5 with the cradles 11. Gates 41, in the form of lower end portions of the arms 29, are also pivoted into "open" positions by the engaged rod 4 at this time. The engaged rod 4 continues to move vertically downwardly from the guide sprockets 16 until the cradles 11 by which it is positively engaged reach the guide sprockets 17. At this point gravity, combined with the fact that the rotating roller 8 is still driving the sheet 3 frictionally in the same direction, causes the cradles 11 to become disengaged from the rod 4 in question, said rod 4 continuing to move downwardly. The rod 4 at the opposite or "tail" end of the sheet 3 is, by this time, commencing to move around the roller 8 and, since the ends of this rod are not engaged and supported by the cradles 11, the jockey rollers 31 and the "closed" gates 41 direct said rod 4 onto the upper ends of the ramps 5 so that the sheet 3 is then replaced at the rear of the stack of sheets in a position in which its upper and lower edges have been inverted, and its front and rear sides reversed, with respect to the position which it occupied prior to being transported around the roller 8.

Shortly after the transfer of a sheet 3 to the rear of the stack, the finger 12 passes the microswitch 14 and operates its lever 13 to release the self-holding relay of the circuit 35. The newly displayed picture, advertisement, notice or other indicia will then remain visible through the window 42 in the cabinet 1 until the production of the next pulse by the circuit 35 at which time the motor 26 will be re-energised and the displayed sheet 3 removed to the rear of the stack to reveal the next sheet 3. As previously mentioned, gravity can be relied upon to move the rods 4 downwardly along the ramps 5 to the front of the device provided that said ramps 5 are correctly inclined to the horizontal. In the example which has been described, the variable resistance 36 can be adjusted to cause the circuit 35 to produce pulses at regular intervals of between about 3 seconds and about 1 minute and it will be realised that this is sufficient range of viewing time for all purposes to which the device is likely to be put. A time of up to 1 minute is generally sufficient even when notices or advertisements including an appreciable amount of reading matter are involved. Since both sides of each sheet 3 will be shown during the exhibition of a complete series of pictures, notices, advertisements or other indicia 38, and since the device which has been described can hold a maximum of about twenty sheets 3, it will be understood that the viewing of a complete series can take up to about forty minutes when the variable resistance 36 is set to produce the maximum time delay between the production of pulses by the circuit 35. The sheets 3 can readily be introduced into, and removed from, the stack thereof located inside the device so that changes in the pictures, notices, advertisements or other indicia 38, or in their viewing order, can be made without difficulty. When the preferred form of sheet 3 employing double-sided adhesive tape or the like is used, the posters on which the indicia 38 appear can be changed without removing the sheets 3 from the device.

A simple device in accordance with the invention has been described but it will be apparent that many refinements are possible. The cabinet 1 may include means for illuminating the displayed picture, notice, advertisement or other indicia 38 and, if desired, alternative forms of electrically-operated delay mechanism to govern the length of time during which each sheet 3 occupies the position in which one side thereof is visible to a viewer of the device may be employed. For example, either a solid-state circuit having a silicon controlled rectifier triggered by a delayed pulse or a thermal delay circuit may be used. Alternatively, or additionally, the device may include tape- or wire-record sound reproducing mechanism to enable the exhibited pictures, notices, advertisements or other indicia to be accompanied by a spoken commentary, music or other appropriate sounds. Under such circumstances, the tape or wire recording may include, at appropriate points, "blip"-producing sections, the "blip" signal being arranged, in a manner which is known per se, to close the self-holding relay of the circuit 35 which circuit, under such circumstances, will be one which does not produce pulses at regular intervals whose lengths are dependent upon the adjusted value of a variable resistance such as the resistance 36. It will be realised that, with a construction of the kind just mentioned, the next picture, notice, advertisement or other indicia 38 of the series will be brought to its viewing position immediately after a "blip" signal has been given by the modified circuit 35. Thus, the periods of time during which the sheets 3 occupy the viewing position will be entirely dependent upon the distances between the "blip" producing signal sections of the tape or wire record and thus need not, and usually will not, be of regular duration. If desired, an electrical "push-button" may be provided in place of the circuit elements which close the self-holding relay. Thus, a lecturer can change the picture or other indicia 38 at appropriate moments merely by pressing the button to close or trip the relay and energise the motor 26.

The modified device which has been described above may have an endless record tape or record wire and may show the series of pictures, notices, advertisements or other indicia 38 in a continuously repeated manner. A device of this kind is particularly useful as an adjunct to display stands at exhibitions and the like. Alternatively, the tape or wire record need not be an endless one and the device may be arranged so that it will only show the series of pictures, notices, advertisements or other indicia 38 once without attention. Devices of this kind, and of the kind in which the series is continuously repeated, are extremely useful as teaching machines and it is emphasised that the invention envisages the use of devices in accordance therewith in teaching machines.

A device in accordance with the invention may have the microswitch 14 replaced by a photo-electric cell. The finger 12 is replaced by a mask plate that interrupts the beam of light between said source and said cell once during each complete passage through the path of movement of the chain 10 to which the mask plate is connected. The device may include a time switch to ensure that it can be arranged to operate only during periods of the day in which there is any likelihood of it being viewed and may also include a known form of switch capable of arrangement so that it cannot be operated to de-energise the motor 26 until a picture or other indicia 38 fills the window 42. The purpose of this is to ensure that the device cannot be accidentally switched off at an instant when one sheet 3 is in course of transfer from the window 42 to the rear of the stack of sheets since, under these circumstances, an incomplete picture or the like 38 would be left showing until the motor 26 was next energised.

I claim:

1. A display device for displaying a number of indicia one after the other, said device comprising a plurality of flexible sheets for supporting indicia for viewing from opposite sides, each said sheet including suspension means at opposite edges thereof, these edges being located at the uppermost and lowermost edges of the sheet when the sheet is vertically suspended, a roller, a ramp for receiving said sheets in a stack with one side of an end sheet visible to a viewer of the device, means for defining a normally closed path around the roller for the suspension means between opposite ends of said ramp, electrically-driven means for positively engaging the uppermost suspension means of a sheet in the viewing position and for transporting this sheet around the roller, control means displaceable responsive to engagement thereof by said uppermost suspension means, owing to the positive engagement of said uppermost suspension means by said electrically-driven means, to permit movement of said uppermost suspension means out of said normally closed path, said uppermost suspension means subsequently being the leading suspension means as regards the direction of displacement around said roller, the lowermost, and subsequently trailing, suspension means of each sheet, being unengaged by said electrically-driven engaging means, remaining in said closed path and hence reaching said ramp to place successive sheets at the opposite end of the stack, and electrically-operated delay means for governing the length of time during which each sheet occupies the position in which one side thereof is visible to a viewer of the device.

2. A display device as claimed in claim 1, wherein the device is arranged to display a number of indicia one after the other in a continuously repeated manner.

3. A display device as claimed in claim 1, wherein the delay mechanism includes a multi-vibrator timing circuit provided with a variable resistance the value of which can be adjusted at will to change the duration of the time between the production of pulses by said circuit, and a relay the circuit being connected with an electric motor for driving the device in such a way that a pulse produced thereby will close the relay to supply electrical power to the motor during use of the device.

4. A display device as claimed in claim 3 further comprising a switch operated by a moving part of the device, said relay comprising a self-holding relay for stopping said electrical motor upon the operation of said switch by said moving part.

5. A display device as claimed in claim 1, wherein the suspension means for the sheets take the form of rods which extend along the uppermost and lowermost edges of the sheets, the rods projecting short distances beyond the opposite lateral edges of said sheets.

6. A display device as claimed in claim 5, wherein the electrically-driven means for positively engaging successive end ones of the stack of sheets and transporting them around the roller to the opposite end of the stack takes the form of a pair of endless transmission chains guided around sprocket wheels, said chains having cradles fixedly secured to them at corresponding points therealong which cradles are arranged to engage the opposite projecting end portions of upper rods of successive sheets to move the sheets positively around the roller and past said holder.

7. A display device as claimed in claim 6, wherein the endless transmission chains are made from a noise-reducing synthetic plastics material.

8. A display device as claimed in claim 6, wherein said lowermost, and subsequently trailing, suspension means comprises a rod which is not directly coupled with said chain, said device further including at least one jockey roller for urging said rod into said ramp and means for resiliently loading said jockey roller into engagement with the first-named roller.

9. A display device as claimed in claim 1, wherein said electrically-driven means includes an endless transmission chain, said moving part comprising a finger carried by said endless transmission chain and said switch comprising a microswitch including an operating lever arranged to be moved by said finger.

References Cited
UNITED STATES PATENTS

| | | | |
|---|---|---|---|
| 1,230,313 | 6/1917 | Meese | 40—78.07 |
| 1,880,210 | 10/1932 | Poliakoff et al. | 40—36 |
| 2,135,207 | 11/1938 | Bramer | 40—36 |
| 2,209,517 | 7/1940 | Flanagan et al. | 40—36 |
| 2,326,179 | 8/1943 | Sneed | 40—36 |
| 3,010,233 | 11/1961 | Wells et al. | 40—36 |

ROBERT W. MICHELL, Primary Examiner

R. CARTER, Assistant Examiner